Figure 1:
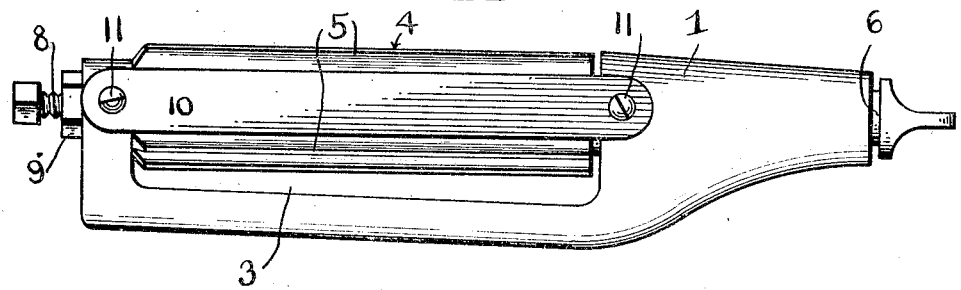

J. M. MILLER.
HORN AND HOOF TRIMMER.
APPLICATION FILED NOV. 1, 1919.

1,330,716.  
Patented Feb. 10, 1920.

Witnesses  
L. B. James

Inventor  
Jasper M. Miller  
By Victor J. Evans  
Attorney

UNITED STATES PATENT OFFICE.

JASPER M. MILLER, OF RUSHVILLE, INDIANA.

HORN AND HOOF TRIMMER.

1,330,716.  Specification of Letters Patent.  Patented Feb. 10, 1920.

Application filed November 1, 1919. Serial No. 334,984.

*To all whom it may concern:*

Be it known that I, JASPER M. MILLER, a citizen of the United States, residing at Rushville, in the county of Rush and State of Indiana, have invented new and useful Improvements in Horn and Hoof Trimmers, of which the following is a specification.

My invention relates to a horn and hoof trimmer of the type driven by power.

It aims to provide a device of this character which is efficient in operation because of its ease of manipulation, and by reason of embodying a milling cutter trims the horn or hoof to a nice clean finish.

Figure 2:
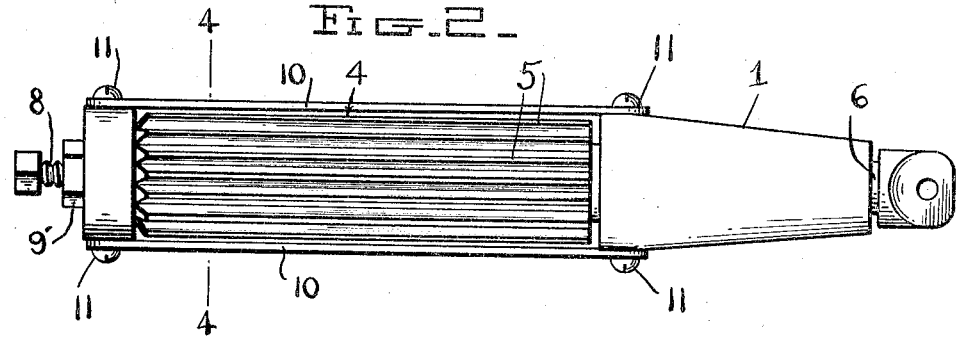
Figure 3:
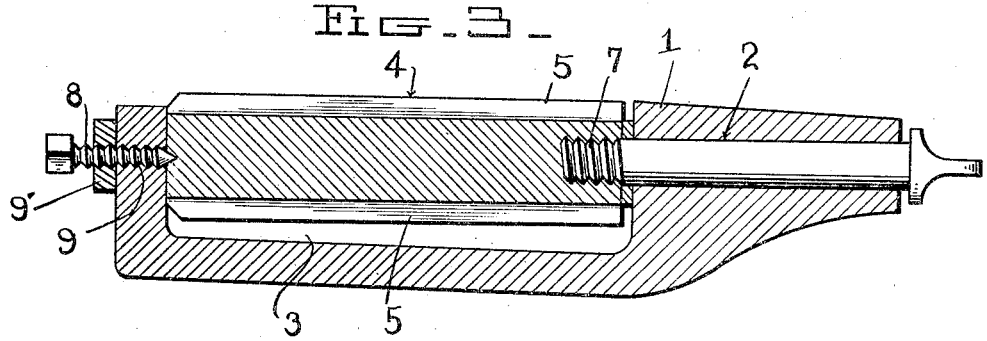
Figure 4:
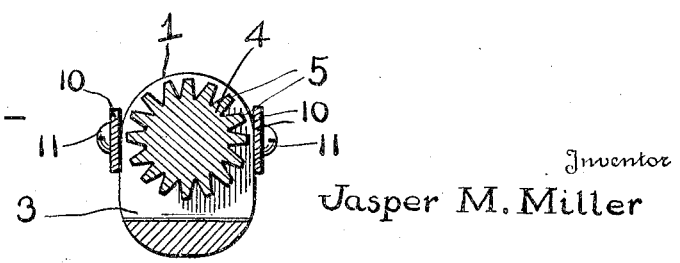

In the drawings, annexed hereto and forming a part of this specification and in which I have shown a specific form of the invention:

Figure 1 is a side elevation of the device forming the subject-matter of my invention, Fig. 2 is a top plan view, Fig. 3 is a longitudinal sectional view therethrough, and Fig. 4 is a transverse sectional view taken on the line 4—4 of Fig. 2.

In detail, the device comprises a substantial U-shaped cutter holder 1 bored as shown at 2 and cut away as at 3 to receive a cylindrical milling cutter 4 having radial edges 5. A spindle 6 threaded as at 7 screws into one end of the milling cutter 4 and is journaled in bore 2 of the cutter holder 1, the outer ends of said spindle being suitably shaped for connection to any power source. At its other end the cutter 4 is supported by a centering screw 8 threaded as shown to screw into opening 9 in the cutter holder 1, while the screw end seats in a center hole in the cutter and is locked in proper relation by a check nut 9'. Strips of metal 10, one on each side of the cutter holder 1, form guards around the cutter 4 and are held in place by screws 11.

While in the foregoing I have described a particular embodiment of my invention, I may depart therefrom in practice to the full extent of the scope of the appended claims.

What I claim is:

1. A device of the class described comprising a substantially U-shaped cutter holder, an extension formed on one end of said member and having a bore-opening at said end, a spindle journaled in said bore and having a threaded terminal projected beyond one end thereof, a cutter arranged in said holder and having a threaded opening in one end to receive the extremity of said spindle, and a centering pin carried by the opposite end of the holder for the cutter.

2. A device of the class described comprising a cutter holder, a spindle journaled in said holder, a cutter detachably associated with one end of the spindle and arranged within the holder, a centering pin carried by the opposite end of the holder for said cutter, parallel strips arranged at the opposite sides of the cutter beneath the upper edge thereof, and means for detachably securing the strips to the holder, as and for the purpose specified.

In testimony whereof I affix my signature.

JASPER M. MILLER.